Aug. 26, 1941.　　A. W. GILKERSON　　2,253,932
SWIVELED COUPLING
Filed Aug. 8, 1939
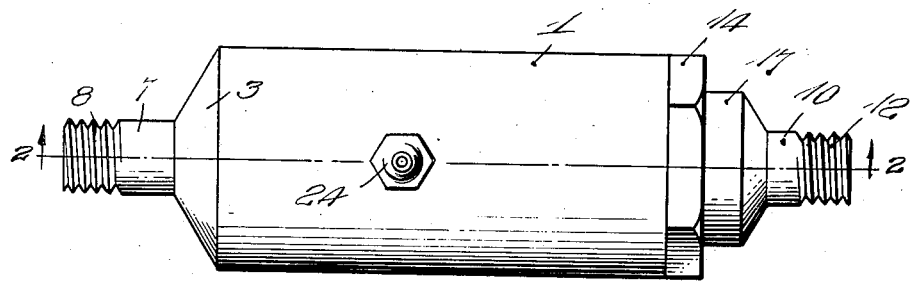
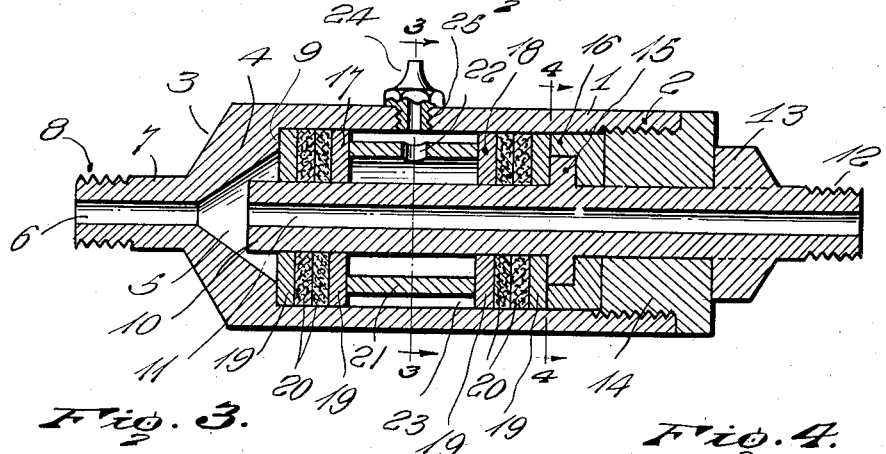
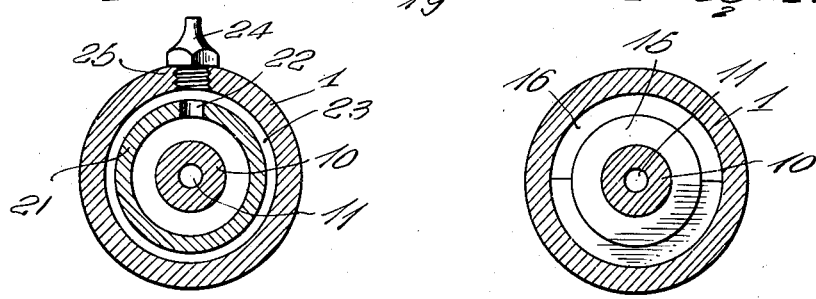
INVENTOR.
Alva W. Gilkerson.
BY
Ross J. Woodward.
ATTORNEY.

Patented Aug. 26, 1941

2,253,932

UNITED STATES PATENT OFFICE 2,253,932

SWIVELED COUPLING

Alva W. Gilkerson, Beaumont, Tex.

Application August 8, 1939, Serial No. 289,054

1 Claim. (Cl. 285—97.8)

This invention relates to a swiveled coupling and it is one object of the invention to provide a device of this character by means of which tubular sections of a pipe line, pump rod or the like may be joined in end to end relation to each other and permitted to turn relative to each other without becoming detached.

Another object of the invention is to so form the swiveled tube joint that it will be packed in a very efficient manner to prevent escape of water, oil, gas or other fluids flowing through the pipe line.

Another object of the invention is to provide a swiveled joint not only packed by packing disks of leather or the like, but also having a space adapted to be filled with fluid under pressure and assist in preventing escape of fluid from the pipe line.

Another object of the invention is to provide a swiveled joint which may be very easily taken apart for cleaning or repairs and then easily and quickly reassembled, the joint, when assembled, being not liable to accidentally come apart when tube sections connected by the joint are turned relative to each other.

The invention is illustrated in the accompanying drawing, wherein:

Fig. 1 is a view looking down upon the improved swiveled joint.

Fig. 2 is a sectional view taken longitudinally through the joint on the line 2—2 of Fig. 1.

Fig. 3 is a transverse sectional view taken on the line 3—3 of Fig. 2.

Fig. 4 is a sectional view taken on the line 4—4 of Fig. 2.

This improved swiveled joint is for connecting tubular sections of a pipe line, tubular pump rod, or the like, and has a cylindrical body 1 formed of strong metal and having one end open and internally threaded, as shown at 2. The other end of the body is formed with a tapered head 3 and internally thickened, as shown at 4, to provide a conical pocket 5 tapered outwardly and, at its outer end, communicating with a bore or passage 6 formed axially through the neck 7 of the head 3. This neck has its outer end portion externally threaded, as shown at 8, for engagement with a tube or pipe section which is to be connected with a companion tube or pipe section by means of the joint. At its inner end the pocket is surrounded by an annular shoulder 9 and from this shoulder to its threaded end, the cylindrical body or barrel is of an even internal diameter.

A tubular stem 10, formed with an axially extending bore 11, extends longitudinally in the body axially thereof and has its outer end portion externally threaded, as shown at 12, for engagement with a tube or pipe section to be connected with the first mentioned pipe section. An outer collar or annular shoulder 13 is formed about the stem for engaging the outer end of a bushing 14 and in spaced relation to the shoulder 13 is an annular collar 15 about which fits a cup-shaped ring 16 disposed snugly between the collar 16 and the bushing 14. The ring and the bushing are of a two-piece formation in order that they may be applied about the stem between the collar 15 and the annular shoulder 13 or the shoulder may be initially formed separate from the stem and brazed or otherwise firmly secured thereto after a solid bushing has been applied to the stem. As the stem and bushing and the ring are circular in cross section, the bushing may be screwed into the barrel and the stem then have turning movement through the bushing. Therefore, the stem and the pipe section carried thereby may have turning movement relative to the barrel and the pipe section with which the neck 7 is engaged, without the bushing working loose from the barrel.

In order to prevent leakage of fluid from the joint, there are provided packing units 17 and 18 which fit about the stem within the barrel. Each of these units consists of steel washers 19 between which are disposed packing disks 20 formed of leather or other suitable material. A tubular spacer 21 formed from a section of pipe or metal tube extends between the packing units to hold them spaced from each other longitudinally of the tube and cause the unit 17 to be held firmly against the shoulder 9 and unit 18 firmly against the collar 16 and the annular edge face of the cup-shaped ring 16 when the bushing is screwed into the threaded end portion of the barrel. The spacer sleeve is of appreciably greater diameter than the stem but of less diameter than the barrel. Therefore, it will be spaced from the stem and also from the walls of the barrel, as shown in Fig. 2. The sleeve is perforated, as shown at 22, in order that the entire space 23 between the packing units may be filled with oil or other fluid under pressure, it being understood that while one perforation 22 has been shown, additional perforations may be provided if desired. A valve controlled nipple or connection 24 which is screwed into a threaded opening 25 formed in the wall of the barrel at the space 23, is provided for engagement with a force pump by means of which grease or the like is forced into the barrel to fill the space 23, and since the material forced into this space will be under greater pressure than the fluid contents of the pocket 4, and the bores 6 and 11 of the neck 7 and the stem 10, it will act as additional means for preventing leakage at the joint.

When pipe sections or tubular rod sections are connected by the improved swivel joint, they may have turning movement relative to each other but leakage will be effectively prevented. It is merely necessary to unscrew the bushing from the barrel and the stem 10 and the elements carried thereby may be withdrawn from the barrel, should it be found necessary to clean the joint or make repairs or replacements. The packing units and the sleeve may then be withdrawn from the stem, repairs or replacements then made, and, after thoroughly cleaning the joint, reassemble it and fill the space 23 with oil or the like forced inwardly through the connection 24.

Having thus described the invention, what is claimed is:

A swiveled coupling comprising a cylindrical barrel having one end open and internally threaded, a head for the other end of the barrel formed with a tubular pipe engaging neck, a tubular stem extending longitudinally in said barrel axially thereof with one end portion protruding from the open end of the barrel and adapted for connection with a pipe, an annular shoulder about the stem externally of the barrel, an annular collar about the stem within the barrel, a threaded bushing rotatably fitting about the stem with its outer end abutting the end of the barrel, a cup-shaped ring fitting snugly between the bushing and the collar with its marginal portions surrounding the collar and having tight fitting engagement with the marginal edge face of the collar and walls of the barrel, packing units surrounding the stem and fitting snugly within the barrel, each packing unit consisting of inner and outer metal discs and discs of flexible packing material between the metal discs, a spacer sleeve about the stem between the packing units having its ends abutting the inner metal discs of the packing units and holding the units spaced from each other with the outer metal disc of one unit tight against the head end of the barrel and the outer metal disc of the other unit tight against the collar and the edge face of the cup-shaped ring when the bushing is tightened, and a valve controlled nipple mounted through the wall of the barrel intermediate the length of the sleeve to admit liquid under pressure into the barrel for filling space between the packing units and apply fluid pressure to the inner metal discs of the packing units and cooperate with the packing units to prevent leakage.

ALVA W. GILKERSON.